United States Patent
Hoan et al.

(10) Patent No.: US 10,274,012 B1
(45) Date of Patent: Apr. 30, 2019

(54) ANTI-TITLING THRUST CAGE

(71) Applicant: Schaeffler Technologies AG & Co. KG, Herzogenaurach (DE)

(72) Inventors: Neil Hoan, Charlotte, NC (US); Alicia Vidal Ortiz, Puebla (MX)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/785,630

(22) Filed: Oct. 17, 2017

(51) Int. Cl.
| | | |
|---|---|---|
| F16C 19/36 | (2006.01) | |
| F16C 19/46 | (2006.01) | |
| F16C 19/30 | (2006.01) | |
| F16C 33/46 | (2006.01) | |
| F16C 33/54 | (2006.01) | |

(52) U.S. Cl.
CPC .......... *F16C 33/467* (2013.01); *F16C 19/305* (2013.01); *F16C 19/361* (2013.01); *F16C 19/46* (2013.01); *F16C 33/541* (2013.01); *F16C 33/546* (2013.01); *F16C 2220/84* (2013.01)

(58) Field of Classification Search
CPC ...... F16C 19/46; F16C 19/305; F16C 19/361; F16C 33/467; F16C 33/541; F16C 33/543; F16C 33/546; F16C 33/4682; F16C 43/083; F16C 2226/74; F16C 2220/84
USPC ............ 384/572, 575, 593, 623; 29/898.041, 29/898.067
See application file for complete search history.

(56) References Cited

U.S. PATENT DOCUMENTS

| | | | | |
|---|---|---|---|---|
| 3,042,464 | A * | 7/1962 | Gothberg | F16C 33/543 384/575 |
| 3,226,170 | A | 12/1965 | Neese | |
| 3,240,542 | A * | 3/1966 | Jahn | F16C 19/305 384/623 |
| 3,256,052 | A * | 6/1966 | Howles | F16C 33/4629 384/580 |
| 3,442,562 | A * | 5/1969 | Teufel | F16C 19/46 384/575 |
| 3,659,912 | A * | 5/1972 | Scheifele | F16C 33/543 384/575 |
| 4,208,078 | A * | 6/1980 | Miki | F16C 33/4635 29/898.061 |
| 7,637,670 | B2 * | 12/2009 | Oishi | F16C 19/30 384/623 |
| 8,480,309 | B2 * | 7/2013 | Ince | F16C 33/546 384/575 |

(Continued)

FOREIGN PATENT DOCUMENTS

| | | | |
|---|---|---|---|
| DE | 102008018291 A1 | 12/2008 | |
| DE | 102008008633 A1 * | 8/2009 | ............ F16C 33/467 |
| GB | 2550420 A * | 11/2017 | .......... F16C 33/3831 |

(Continued)

*Primary Examiner* — Marcus Charles
(74) *Attorney, Agent, or Firm* — Volpe and Koenig, P.C.

(57) ABSTRACT

A cage for a thrust bearing assembly is disclosed. The cage includes a radially inner flange, a radially outer flange, and a plurality of crossbars extending therebetween that define a lower portion of a plurality of rolling element pockets. The radially inner flange includes a first plurality of retention bars extending radially outwardly, and the radially outer flange includes a second plurality of retention bars extending radially inwardly. The first plurality of retention bars and the second plurality of retention bars each partially define an upper portion of the plurality of rolling element pockets.

14 Claims, 5 Drawing Sheets

(56) References Cited

U.S. PATENT DOCUMENTS 8,926,191 B2 * 1/2015 Fugel ................... F16C 19/30
                                                                                                   384/623
9,593,714 B1 * 3/2017 Ince ................. F16C 33/4676

FOREIGN PATENT DOCUMENTS

| JP | 44-15450 | * | 7/1969 | |
|---|---|---|---|---|
| JP | 50-121144 | * | 10/1975 | |
| WO | WO-2008108134 A1 | * | 9/2008 | ............ F16C 33/467 |
| WO | WO-2008129916 A1 | * | 10/2008 | ............ F16C 23/086 |

\* cited by examiner

ANTI-TITLING THRUST CAGE

FIELD OF INVENTION

This invention is generally related to a bearing cage, and more particularly related to a bearing cage for a thrust bearing assembly.

BACKGROUND

Bearing cages are well known for retaining rolling elements in bearing assemblies. Known types of bearing cages include thrust bearing cages and sigma-type bearing cages, such as disclosed in U.S. Pat. No. 3,226,170 and DE 102008018291. Known box cage designs require two stamped pieces that are manufactured in separate formation steps. These two stamped cage pieces must be precisely aligned during assembly, which makes production expensive. Other known cage designs, such as sigma cages, do not provide sufficient guidance for the rolling elements, and the rolling elements are therefore prone to tilting during operation.

It would be desirable to provide a cage for rolling elements that is relatively simple to manufacture and provides guidance for the rolling elements to prevent tilting.

SUMMARY

Briefly stated, a cage for a thrust bearing assembly is disclosed that provides improved retention for rolling elements. The cage includes a radially inner flange, a radially outer flange, and a plurality of crossbars extending therebetween that define a lower portion of a plurality of rolling element pockets. The radially inner flange includes a first plurality of retention bars extending radially outwardly, and the radially outer flange includes a second plurality of retention bars extending radially inwardly. The first plurality of retention bars and the second plurality of retention bars each partially define an upper portion of the plurality of rolling element pockets. The retention bars provide retention points and guidance for the rolling elements and prevent titling of the rolling elements.

Preferred arrangements with one or more features of the invention are described below and in the claims.

BRIEF DESCRIPTION OF THE DRAWING

The foregoing summary as well as the following detailed description will be best understood when read in conjunction with the appended drawing. In the drawing.

DETAILED DESCRIPTION OF THE PREFERRED EMBODIMENTS

Figure 1A:
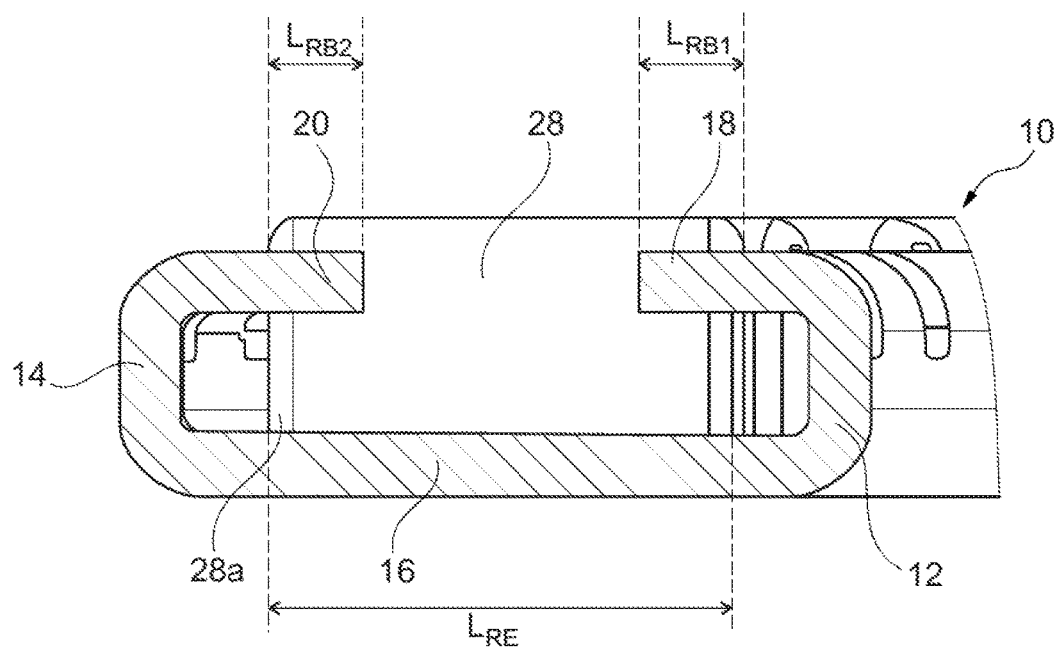
FIG. 1A is a cross-sectional view of a cage according to a first embodiment.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

Figure 1B:
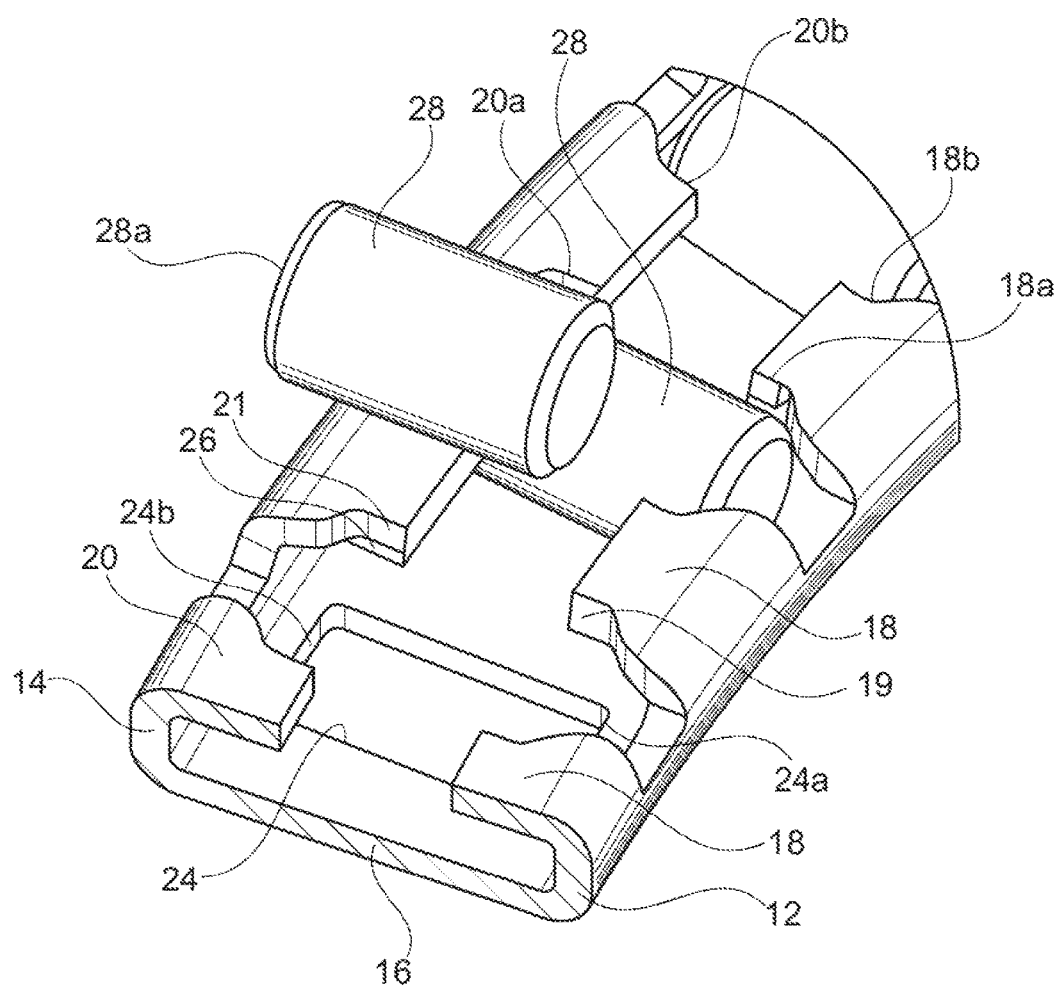
FIG. 1B is a perspective view of a partial cross section of the cage of FIG. 1A.

As shown in FIGS. 1A and 1B a first embodiment of a cage 10 for a thrust bearing assembly is disclosed. The cage 10 includes a radially inner flange 12, a radially outer flange 14, and a plurality of crossbars 16 extending therebetween that define a lower portion 24 of a plurality of rolling element pockets. As shown in FIG. 1B, the lower portion 24 of the rolling element pockets is defined as bore having a rectangular profile. The cage 10 is preferably formed by stamping.

The radially inner flange 12 includes a first plurality of retention bars 18 extending radially outwardly, and the radially outer flange 14 includes a second plurality of retention bars 20 extending radially inwardly. The first plurality of retention bars 18 and the second plurality of retention bars 20 each partially define an upper portion 26 of the plurality of rolling element pockets. The lower portion 24 and the upper portion 26 of the rolling element pockets provide reliable retention for securing rolling elements 28 within the cage 10, and preventing tilting of the rolling elements 28 during operation. The plurality of rolling elements 28 are captively secured within the plurality of rolling element pockets. The plurality of rolling elements 28 are snapped into the plurality of rolling element pockets.

As shown in FIG. 1A, the first plurality of retention bars 18 and the second plurality of retention bars 20 each overlap with at least 5% of an axial length of respective axial ends of a respective one of the plurality of rolling elements 28. This is illustrated in FIG. 1A, which shows lengths ($L_{RB1}$, $L_{RB2}$) of the retention bars 18, 20 each extending from the radial flanges 12, 14 for at least 5% of an axial length ($L_{RE}$) of the rolling elements 28. In one embodiment, the lengths ($L_{RB1}$, $L_{RB2}$) of the retention bars 18, 20 are each at least 20% of the axial length ($L_{RE}$) of the rolling elements 28.

The first plurality of retention bars 18 and the second plurality of retention bars 20 each include chamfered lateral surfaces 18a, 18b, 20a, 20b. The plurality of rolling elements 28 include tapered axial ends 28a. The combination of the chamfered lateral surfaces 18a, 18b, 20a, 20b of the retention bars 18, 20 and tapered axial ends 28a of the rolling elements 28 provide a convenient arrangement for pressing the rolling elements 28 into the cage 10. In one embodiment, the chamfered lateral surfaces 18a, 18b, 20a, 20b are formed as coined edges. As used herein, a coined edge is an edge that is partially flattened by mechanical deformation, such as smashing or pressing, of material between a forming punch and a die to create a mushroomed region.

As shown in FIG. 1B, each retention bar of the first plurality of retention bars 18 axially overlaps first ends 24a of two adjacent lower portions 24 of the plurality of rolling element pockets, and each retention bar of the second plurality of retention bars 20 axially overlaps second ends 24b of two adjacent lower portions 24 of the plurality of rolling element pockets. This configuration ensures that the retention bars 18, 20 extend over the associated rolling elements 28.

Figure 2A:
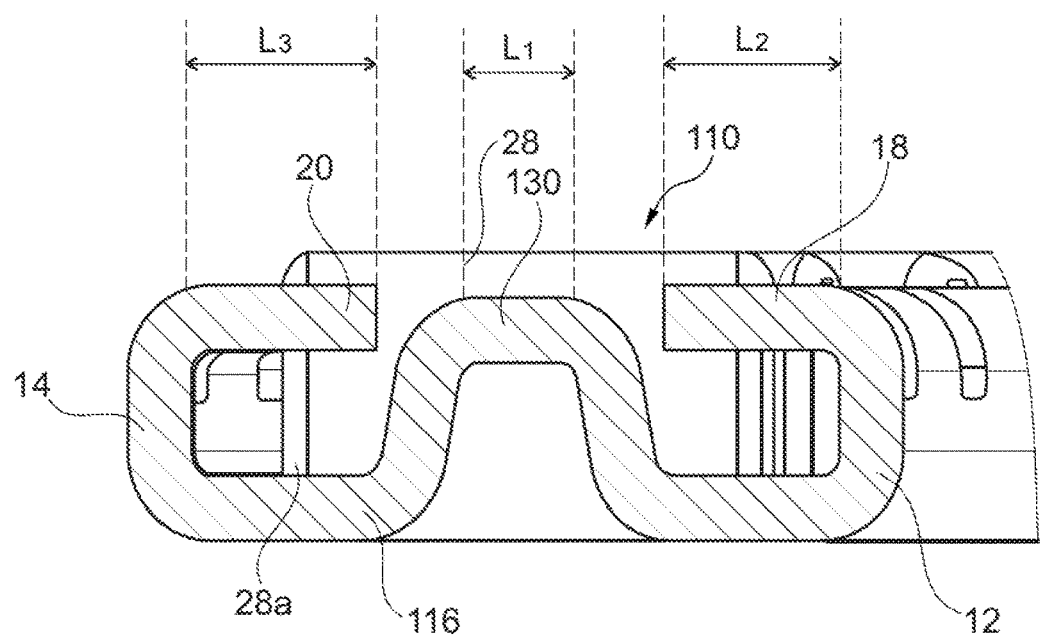
FIG. 2A is a cross-sectional view of a cage according to a second embodiment.
Figure 2B:
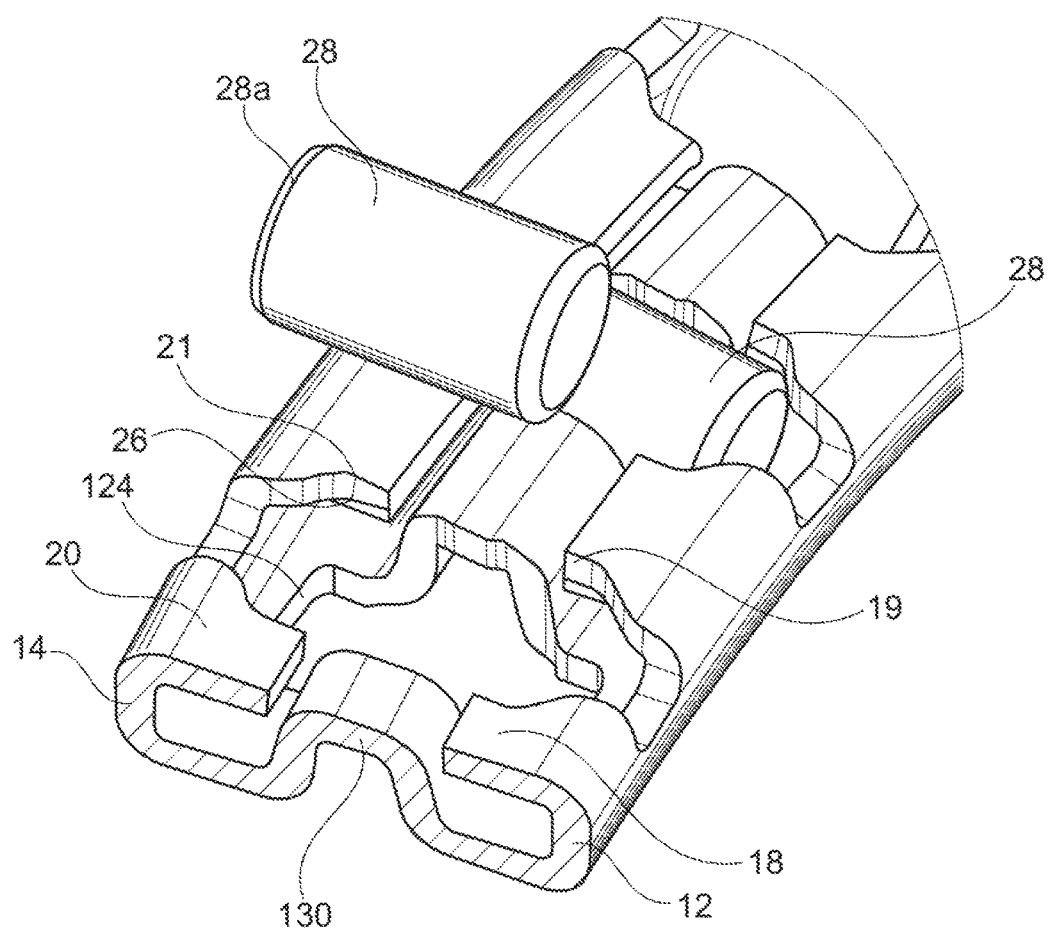
FIG. 2B is a perspective view of a partial cross section of the cage of FIG. 2A.
Figure 2C:
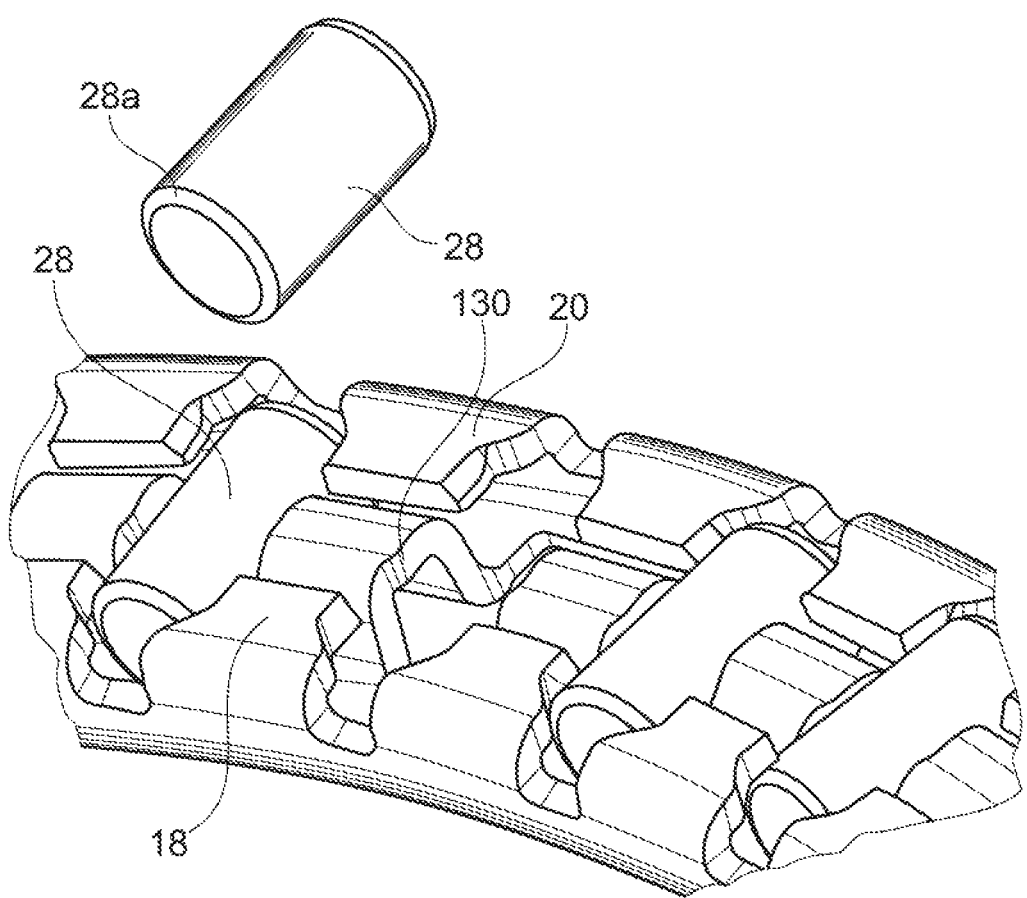
FIG. 2C is a perspective view of a portion of the cage of FIGS. 2A and 2B.

In the embodiment shown in FIGS. 2A-2C, the plurality of crossbars 116 of the cage 110 includes a plurality of medial portions 130 that extend upwards and partially define the upper portion of the plurality of rolling element pockets.

The embodiment of FIGS. 2A-2C includes similar elements as the embodiment of FIGS. 1A and 1B, and similar elements such as the first plurality of retention bars 18, the second plurality of retention bars 20, and other components not specifically discussed are identified with similar reference numerals.

A combination of lengths of each one of the medial portions ($L_1$), each one of the first plurality of retention bars ($L_2$), and each one of the second plurality of retention bars ($L_3$) extends for a majority of each of the lower portion of the plurality of rolling element pockets. This arrangement provides an upper portion 126 of the rolling element pocket that reliably retains and guides the rolling elements 28.

Having thus described various embodiments of the present cage in detail, it is to be appreciated and will be apparent to those skilled in the art that many changes, only a few of which are exemplified in the detailed description above, could be made in the cage without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG TO REFERENCE NUMBERS cage 10, 110
radially inner flange 12
radially outer flange 14
crossbars 16, 116
first plurality of retention bars 18
lateral surfaces 19, 21
second plurality of retention bars 20
chamfered lateral surfaces 18a, 18b, 20a, 20b
lower portion of rolling element pocket 24, 124
ends of lower portion of rolling element pocket 24a, 24b
upper portion of rolling element pocket 26, 126
rolling elements 28
tapered axial ends 28a
medial portions 30, 130

What is claimed is:

1. A cage for a thrust bearing assembly, the cage comprising:
   a radially inner flange, a radially outer flange, and a plurality of crossbars extending therebetween that define a lower portion of a plurality of rolling element pockets, a plurality of medial portions of the plurality of crossbars extends upward and partially defines an upper portion of the plurality of rolling element pockets,
   the radially inner flange includes a first plurality of retention bars extending radially outwardly, the radially outer flange includes a second plurality of retention bars extending radially inwardly, the first plurality of retention bars and the second plurality of retention bars each partially define the upper portion of the plurality of rolling element pockets.

2. The cage of claim 1, wherein each retention bar of the first plurality of retention bars axially overlaps first ends of two adjacent lower portions of the plurality of rolling element pockets, and each retention bar of the second plurality of retention bars axially overlaps second ends of two adjacent lower portions of the plurality of rolling element pockets.

3. The cage of claim 1, wherein lateral surfaces of the first plurality of retention bars and the second plurality of retention bars have coined edges.

4. The cage of claim 1, wherein a combination of lengths of each one of the medial portions, each one of the first plurality of retention bars, and each one of the second plurality of retention bars extends for a majority of each of the lower portion of the plurality of rolling element pockets.

5. The cage of claim 1, wherein the cage is formed by stamping.

6. The cage of claim 1, wherein the first plurality of retention bars and the second plurality of retention bars each include chamfered lateral surfaces.

7. A roller-cage assembly comprising:
   a plurality of rolling elements; and
   a cage including:
      a radially inner flange, a radially outer flange, and a plurality of crossbars extending therebetween that define a lower portion of a plurality of rolling element pockets, a plurality of medial portions of the plurality of crossbars extends upward and partially defines an upper portion of the plurality of rolling element pockets,
      the radially inner flange includes a first plurality of retention bars extending radially outwardly, the radially outer flange includes a second plurality of retention bars extending radially inwardly, the first plurality of retention bars and the second plurality of retention bars each partially define the upper portion of the plurality of rolling element pockets, and the plurality of rolling elements are captively secured within the plurality of rolling element pockets.

8. The roller-cage assembly of claim 7, wherein the plurality of rolling elements include tapered axial ends.

9. The roller-cage assembly of claim 7, wherein the first plurality of retention bars and the second plurality of retention bars each include chamfered lateral surfaces.

10. The roller-cage assembly of claim 7, wherein the first plurality of retention bars and the second plurality of retention bars each overlap at least 20% of an axial length of respective axial ends of the plurality of rolling elements.

11. The roller-cage assembly of claim 7, wherein the plurality of rolling elements are snapped into the plurality of rolling element pockets.

12. The roller-cage assembly of claim 7, wherein the cage is formed by stamping.

13. The roller-cage assembly of claim 7, wherein lateral surfaces of the first plurality of retention bars and the second plurality of retention bars have coined edges.

14. The roller-cage assembly of claim 7, wherein a combination of lengths of each one of the medial portions, each one of the first plurality of retention bars, and each one of the second plurality of retention bars extends for a majority of each of the plurality of rolling elements.

* * * * *

UNITED STATES PATENT AND TRADEMARK OFFICE
CERTIFICATE OF CORRECTION

| | | |
|---|---|---|
| PATENT NO. | : 10,274,012 B1 | Page 1 of 1 |
| APPLICATION NO. | : 15/785630 | |
| DATED | : April 30, 2019 | |
| INVENTOR(S) | : Neil Hoan and Alicia Vidal Ortiz | |

It is certified that error appears in the above-identified patent and that said Letters Patent is hereby corrected as shown below:

On the Title Page

In Item (54), in the title, delete "-TITLING" and insert -- -TILTING --.

Signed and Sealed this
Twenty-fifth Day of June, 2019

Andrei Iancu
*Director of the United States Patent and Trademark Office*